United States Patent [19]

Grunza et al.

[11] 4,255,816
[45] Mar. 10, 1981

[54] RECEIVING APPARATUS HAVING A PLURALITY OF ANTENNAS

[75] Inventors: Gene Grunza, Blackwood; Marvin B. Herscher, Cherry Hill, both of N.J.

[73] Assignee: Threshold Technology, Inc., Delran, N.J.

[21] Appl. No.: 942,493

[22] Filed: Sep. 15, 1978

Related U.S. Application Data

[63] Continuation-in-part of Ser. No. 737,510, Nov. 1, 1976, abandoned.

[51] Int. Cl.³ .......................... H04B 1/06; H04B 7/08
[52] U.S. Cl. ..................................... 455/277; 455/136
[58] Field of Search ................ 307/359; 343/725, 742, 343/777, 876; 179/15 A, 15 B, 15 D, 15 M; 455/52, 134–136, 272, 275–278, 218

[56] References Cited

U.S. PATENT DOCUMENTS

| | | | |
|---|---|---|---|
| 2,729,741 | 1/1956 | Chapman | 325/370 |
| 2,872,568 | 2/1959 | Provaz | 325/370 |
| 2,937,268 | 5/1960 | Downie et al. | 325/370 |
| 3,037,113 | 5/1962 | Bier | 325/370 |
| 3,182,263 | 5/1965 | Gossard | 325/370 |
| 3,873,926 | 3/1975 | Wright | 325/478 |
| 3,883,850 | 5/1975 | Martin et al. | 179/15 A |

*Primary Examiner*—Jin F. Ng
*Attorney, Agent, or Firm*—Martin Novack

[57] ABSTRACT

An apparatus is disclosed for receiving and processing transmitted electromagnetic waves, for example transmitted radio signals which contain audio information including recognizable speech information. In accordance with the invention, there are provided first and second spaced antennas. Switching means are provided for coupling either the first or the second antenna to a common channel. Signal processing means are provided for processing the signals on the common channel. Means are provided for comparing the signal on the common channel with a predetermined threshold condition and for generating a control signal in response to the comparison. Finally, means are provided for applying the control signal to the switching means to control selection of the first or second antenna. In one preferred embodiment of the invention, the comparator means comprises means for comparing the energy level of the signal at the common channel with a predetermined energy threshold. During operation, the antenna which is active at a particular time will remain active (i.e. coupled to the common channel) so long as the received radio frequency energy, at the characteristic transmission frequency, remains above the predetermined threshold level. If the level of received energy at this characteristic frequency falls below the predetermined threshold level (for example, by virtue of the antenna momentarily being in a multipath "dead" spot), the comparator means will sense this condition and operate the switch such that the other antenna is coupled to the common channel and becomes active. In another form of the invention the signal processing means includes means for generating an automatic gain control (AGC) signal which depends upon the instantaneous level of the signal on the common channel. A signal derived from the AGC signal is compared with a threshold signal that depends upon a predetermined reference, and a control signal is generated when the signal derived from the AGC signal exceeds the threshold signal.

3 Claims, 2 Drawing Figures

RECEIVING APPARATUS HAVING A PLURALITY OF ANTENNAS

BACKGROUND OF THE INVENTION

This is a continuation-in-part of U.S. application Ser. No. 737,510 filed Nov. 1, 1976, now abandoned.

This invention relates to an apparatus for receiving and processing transmitted electromagnetic signals and, more particularly, to an apparatus for receiving and processing transmitted radio signals while minimizing the effect of multiple transmission paths.

In various applications where information is transmitted over the airwaves, the problem of loss of signal or of excessive noise can cause deterioration of the communication system's function, even over relatively short distances. One application where these considerations come strongly into play is related to speech recognition equipments. Speech recognition equipments have recently begun to gain commercial acceptance in voice command applications. Typically, a speed recognition equipment is programmed to understand a restricted vocabulary of spoken words and to distinguish between these spoken words with a relatively high degree of accuracy. When a particular word from among the restricted vocabulary is spoken, the speech recognition equipment generates an occurrence indication which is indicative of the word which was spoken, and the occurrence indication is utilized to control a companion system. For example, the companion system may respond to the speech command by routing an object to a particular location which was spoken by the operator or by recording inventory information spoken by the operator. A single speech recognition equipment can be time-shared from a number of operator stations so that operators at different locations can send oral commands over transmission channels, such as different airwave transmission frequencies, to the speech recognition equipment. The speech recognition equipment responds, such as by feeding appropriate inventory or routing information (corresponding to the oral command) to a computer or companion system. In such a setup, it will be understood that loss of signal level or clarity can result in degradation of speech recognition function. In the copending U.S. patent application Ser. No. 678,299, filed Apr. 19, 1976, now U.S. Pat. No. 4,063,031, issued Dec. 13, 1977, there is disclosed a system of this type wherein redundant transmission channels, such as two different transmission frequencies, are available at each operator location. Upon sensing a certain noisy condition on one channel, automatic switching to the other channel is effected to increase the signal-to-noise ratio. One disadvantage of this technique is that two redundant transmission frequencies must be assigned to each operator location. Also, the technique of the referenced application is not necessarily responsive to the problem of signal loss due to the so-called "multipath" phenomenon.

A "multipath" problem arises when a transmitted signal arrives at a receiving location via a number of different possible paths due to reflection off various objects. For example, consider the situation where there exists a direct beam which travels a given path length and an indirect beam which travels the same path length plus one-half wavelength of the beam's characteristic electromagnetic energy. In such case, the two received signals would add destructively, thereby reducing the amplitude of the received signal. In actual situations, there are typically a large number of different paths and phase considerations involved, and it is generally known that this results in certain receiving "dead" spots where substantial destructive interference is occurring. Unfortunately, the location of "dead" spots varies from moment to moment with operating conditions, especially where the location of a movable transmitter is changing or where the objects causing reflection are moving. One proposed solution to the "multipath" problem is to provide a pair of spaced receiving systems, each having its own antenna. The outputs of the two receivers are continuously compared, and the output of the particular receiver having a superior quality factor is selected. As soon as a change in the situation is sensed, automatic switching to the other receiver is effected. This technique generally solves the "multipath" problem since it is highly improbable that the spaced antennas of the two receivers will each simultaneously be at a "dead" spot. However, the scheme is disadvantageous in that it requires redundant receiver systems which introduce additional expense and unreliability.

In addition to the need for providing solution to well recognized "multipath" problems, applicants have noted that a further problem, related to the "multipath" problem, arises when certain noise generating sources, such as fluorescent lights, are present in the general region of the transmission path. The mechanism which creates this type of noise is not fully understood at this time, but the problem is particularly noticeable in narrow band receivers at UHF frequencies when the receiving antenna is at or near a null point.

It is an object of the present invention to provide solution to the prior art problems as set forth.

SUMMARY OF THE INVENTION

The present invention is directed to an apparatus for receiving and processing transmitted electromagnetic waves, for example transmitted radio signals which contain audio information including recognizable speech information. In accordance with the invention, there are provided first and second spaced antennas. Switching means are provided for coupling either the first or the second antenna to a common channel. Signal processing means are provided for processing the signals on the common channel. Means are provided for comparing the signal on the common channel with a predetermined threshold condition and for generating a control signal in response to the comparison. Finally, means are provided for applying the control signal to the switching means to control selection of the first or second antenna.

In the preferred embodiment of the invention, the comparator means comprises means for comparing the energy level of the signal at the common channel with a predetermined energy threshold. During operation, the antenna which is active at a particular time will remain active (i.e. coupled to the common channel) so long as the received radio frequency energy, at the characteristic transmission frequency, remains above the predetermined threshold level. If the level of received energy at this characteristic frequency falls below the predetermined threshold level (for example, by virtue of the antenna momentarily being in a multipath "dead" spot), the comparator means will sense this condition and operate the switch such that the other antenna is coupled to the common channel and becomes active.

In a further embodiment of the invention, the signal processing means includes means for generating an automatic game control (AGC) signal which depends upon instantaneous level of the signal on the common channel. In this embodiment, means are provided for comparing signal derived from the AGC signal with a threshold signal that depends upon a predetermined reference, and for generating a control signal when the signals derived from the AGC signal exceeds the threshold signal. This control signal is then applied to the switching means to effect switching to the other antenna. If desired, both the just-mentioned control signal and the previously described control signal of the first embodiment can be used to effect switching to the other antenna.

The described further embodiment is particularly applicable to the problem, noted above, which arises when certain noise generating sources, such as fluorescent lights, are present in the general region of the transmission path, and tend to exacerbate the "multipath" problem. Applicants have found that when this type of interference begins to be encountered, the AGC voltage will begin to fluctuate rapidly and provide early warning of a potential "multipath" problem. Switching to the other antenna is then effected prior to detectable degradation of the audio signal. To assure optimum switching under varied conditions, an embodiment of the invention uses both the sensing of RF level and the sensing of changes in the AGC voltage to effect switching.

Further features and advantages of the invention will become more readily apparent from the following detailed description when taken in conjunction with the accompanying drawings.

DESCRIPTION OF THE PREFERRED EMBODIMENT

Figure 1:
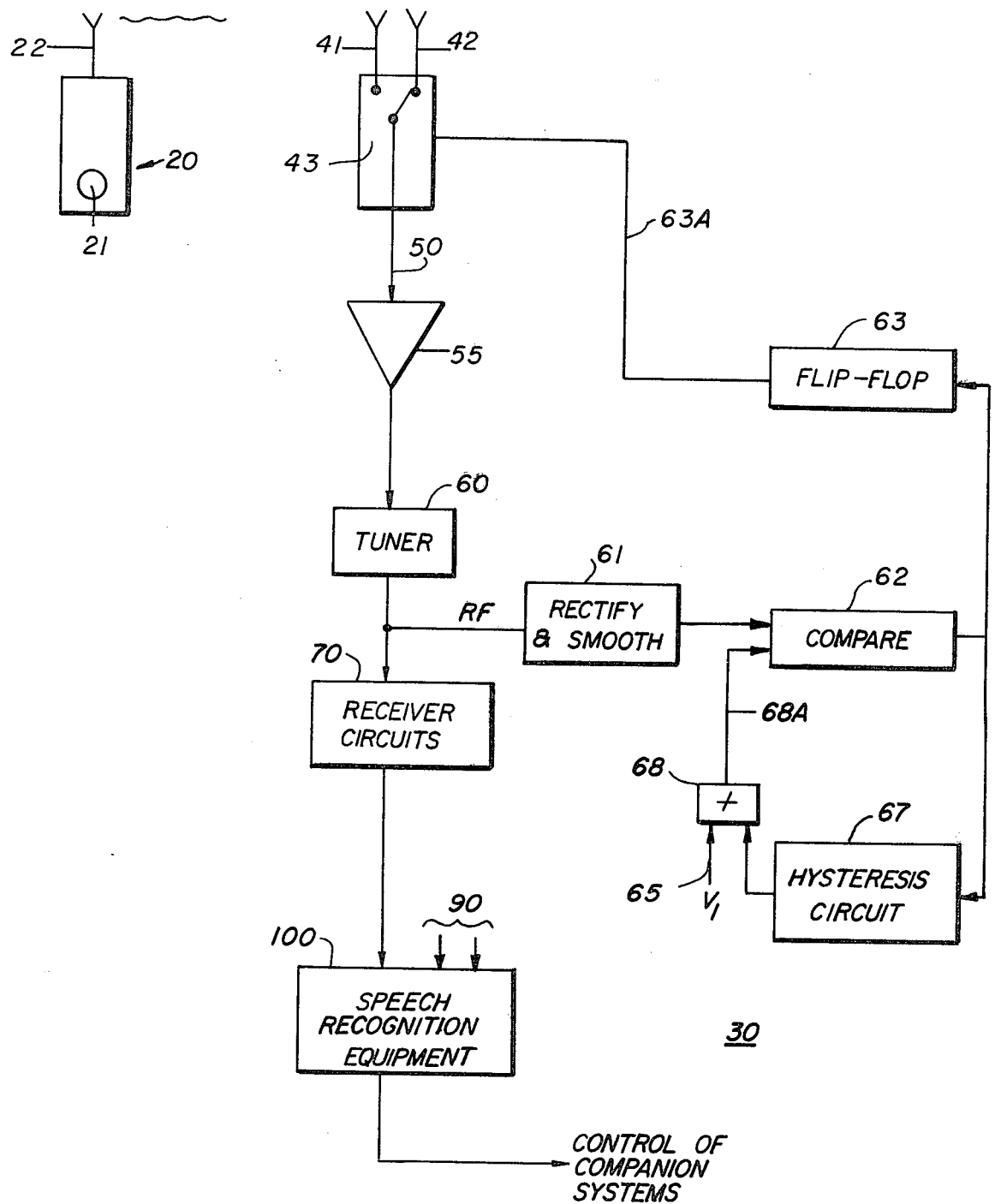
FIG. 1 is a schematic block diagram of an apparatus in accordance with an embodiment of the invention.

Referring to FIG. 1, there is shown a schematic block diagram of an apparatus in accordance with an embodiment of the invention. In broad terms, an operator speaks voice commands into a microphone 21 and these commands are transmitted, e.g. via a mobile transmitter 20 and transmitting antenna 22, to a receiving location at which a speech recognition equipment 100 is employed to recognize the spoken word commands of the operator. The speech recognition equipment generates signals which control the operation of a companion system, such as a computer. In accordance with the invention, signals from the microphone 21 are coupled to the transmitter 20 which performs conventional modulation of a radio frequency carrier signal which is transmitted at a preselected characteristic frequency. The system of the invention, designated generally by the reference numeral 30, is typically located at a central receiving location which may receive signals transmitted from one or more remote locations. A pair of receiving antennas 41 and 42 are coupled, via a switch 43, to a common channel or line 50. The switch 53, represented diagrammatically in the drawing, is preferably a solid state switch, and couples either the antenna 41 or the antenna 42 to the line 50, depending upon the status of a control signal on the line 63A. The signal on line 50 is coupled via a preamplifier 55 to a conventional tuner circuit 60 which is tuned to the characteristic frequency of the originally transmitted signal. The output of the tuner 60 is coupled to conventional receiver circuitry 70 which typically includes suitable filtering and demodulating circuits which serve to recover the original audio signal. The audio signal output of circuitry 70 is coupled to a speech recognition system 100, which may be of the type manufactured and sold by Threshold Technology Inc. of Delran, N.J., for example their model No. VIP-100. The equipment 100 detects the presence of speech in the audio signals and compares the spoken words with a limited number of stored vocabulary words to determine whether one of the vocabulary words has been spoken. If so, an occurrence indication representative of the particular word is output, for example on line 100A, and is utilized to control a companion system. The equipment 100 may be operated on a time shared basis and receive inputs (e.g. from other transmitter/receiver subsystems), as is represented by the additional inputs 90.

The output of tuner 60, viz. the received radio frequency signal, is also coupled to a rectifying and smoothing circuit 61 which typically includes rectifying diodes and a capacitive smoothing network. Accordingly, the output of circuitry 61 is a varying voltage level which represents the energy level of the radio frequency signal output of the tuner circuitry 60. A comparator 62 is operative to compare the output of the circuit 61 with a predetermined reference level applied at a line 68A. The comparator output will be "low" if the output of circuit 61 is above the predetermined reference level; it will be "high" if the output of circuit 61 does not exceed the predetermined reference level. A hysteresis circuit 67 is associated with comparator 62. This circuit feeds back a portion of the comparator output voltage to an adder 68 which adds it to a preselected input voltage level on a line 65, designated $V_1$, to produce the reference level on line 68A. Once the output voltage of circuit 61 decreases below the reference level on line 68A, the hysteresis circuit 67 increases the threshold level by an amount designated $\Delta V$. The output of circuit 61 must then exceed $V_1$ by an amount equal to $\Delta V$ before comparator 62 will change output states. The inclusion of the hysteresis circuit 67, of which various types are known in the art, prevents comparator 62 from oscillating when the output of circuit 61 is equal to the preselected input voltage level. The output of comparator 62 is coupled to the clock input of flip flop 63 which is of the type commonly referred to as an edge triggered, toggle flip flop. The output state of such a device will switch each time the clock input to the device undergoes a "low"-to-"high" voltage transition. Accordingly, the flip flop 63 will change states and activate switch 43 in response to a "low"-to-"high" transition of the output of comparator 62.

To understand operation of the apparatus, assume that a switch 43 is coupling the antenna 41 to the common channel 50. If sufficient RF energy is being received, the switch 43 will remain in its stated position and the received radio signals will be processed with the operated voice commands being recognized by speech recognition equipment 100 and appropriate control of companion systems being implemented. If the levels of RF energy received at the antenna 41 falls below the predetermined threshold level (for example, by virtue of the antenna 41 momentarily being in a multipath "dead" spot), the output of the circuit 61 will fall below the threshold level applied at line 65. This will cause a low to high transition in the output of the comparator 62 which, in turn, will cause the flip flop 63 to change its output and modify the status of the switch 43 so that the other antenna (42) will be coupled to the common channel 50. The hysteresis circuit 67 insures that constant repetitive switching of switch 43 will not occur if the RF energy received via the other antenna (42) is also below the predetermined threshold level. The RF energy received via this antenna must first increase to a level equal to ΔV above the predetermined threshold level 65 before the output of comparator 62 will return to the "low" state. Comparator 62 must first go "low" and then go "high" before the switch 43 can be activated again because flip flop 63 changes state only on "low"-to-"high" transitions of the output of comparator 62. Once the output of comparator 62 is set to the "low" state, the switching circuitry is rearmed and prepared to switch antennas if the RF energy falls below the predetermined reference level.

Figure 2:
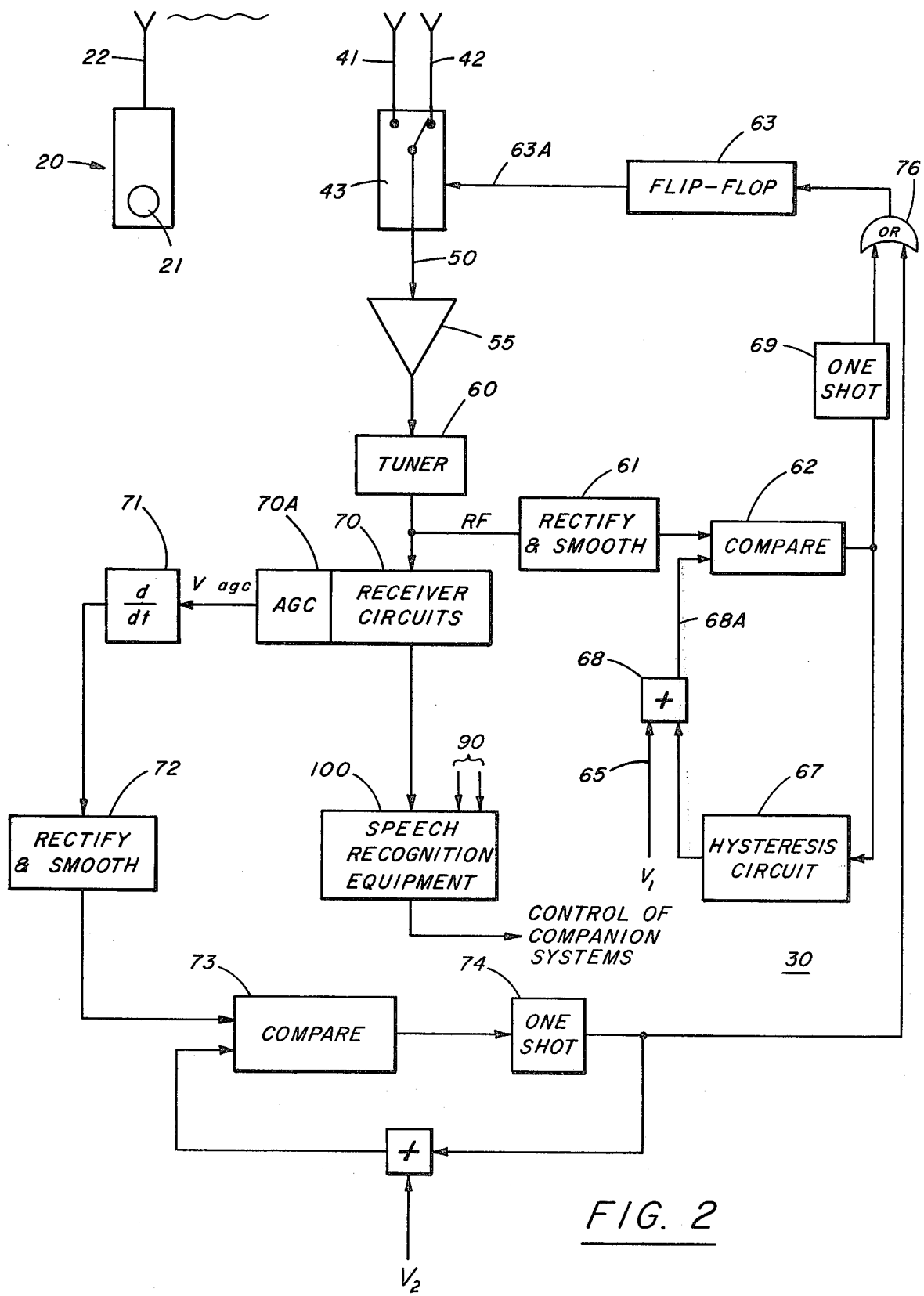
FIG. 2 is a schematic block diagram of an apparatus in accordance with another embodiment of the invention.

Referring to FIG. 2, there is shown a further embodiment of the invention which includes a feature for automatically switching antennas in anticipation of a significant drop in signal level caused by the type of multipath problems which are found to occur in the presence of certain interfering elements such as fluorescent lights. The antennas 41 and 42, switch 43, amplifier 55, tuner 60, receiver 70, and speech recognition equipment 100 may be the same as their counterparts in FIG. 1. Also, rectify and smooth circuit 61, comparator 62, hysteresis circuit 67 and adder 68 operate in the same manner as in FIG. 1. In the present embodiment, automatic gain control ("AGC") circuitry 70A is provided. The AGC circuitry may be of any suitable known type, and may be either a "stand alone" circuit or be part of an available receiver circuitry package. For example, the AGC may be a portion of commercially available receiver integrated circuit made by various manufacturers, such as the Model uA3089 FM IF Limiter Detector Audio Preamplifier manufactured by Fairchild Corp. The output of the AGC portion of the receiver circuit (or of the stand alone AGC circuit, as the case may be) is a varying DC level designated $V_{agc}$. This voltage is coupled to a differentiating element 71 which may comprise a series capacitor, whose output is $dV_{agc}/dt$. The output of differentiation element 71 is coupled to rectify and smooth circuit 72 whose output is, in turn, one input to comparator circuit 73. The output of comparator 73 is coupled to a monostable or "one-shot" multivibrator 74 whose output is coupled to one input of adder 75. The other input to adder 75 is a reference voltage designated $V_2$. The output of adder 75 is coupled to the other input of comparator 73. Also, the output of one-shot multivibrator 74 is coupled to one input of OR gate 76. The other input to OR gate 76 is the output of one-shot multivibrator 69 which is, in turn, triggered by the output of comparator 62. The output of OR gate 76 is coupled to flip-flop 63 which controls the switch 43.

In operation, a rapid change of the AGC signal will cause an output of comparator 73, the threshold for a comparator output being a function of the predetermined reference level, $V_2$. The output of comparator 73 triggers one-shot 74 which, in turn, triggers the flip-flop 63, via OR gate 76, to switch to the other antenna 41 or 42. The output of one-shot 74 is added to the predetermined reference, $V_2$, so that immediately after the one-shot is triggered, the comparator output will go low and remain low for the duration of the one-shot output. This prevents the just described portion of the circuit from reactivating switch 43 due to transients caused by the switching operation. The one-shot 69 is triggered by low-to-high transitions of the output of comparator 62 whose operation was described in conjunction with the FIG. 1 embodiment. The "OR" gate 76 allows the flip-flop 63 to be activated (and cause switching) when either or both one-shots fire. The one-shots prevent a constant high output from one comparator from obscuring a low-to-high transition of the other comparator. If desired, the output of the circuitry which detects changes in AGC level can be utilized independently, but in the embodiment of FIG. 2, there is the advantage of having switching effected by both the AGC "early warning" detection and by RF detection which causes switching after any null has caused a drop in RF level.

The invention has been described with reference to a particular embodiment, but variations within the spirit and scope of the invention will occur to those skilled in the art. For example, it will be understood that additional antennas can, if desired, be employed with a sequencer or multiterminal switch being substituted for the switch 43. Finally, while the invention has been described with reference to a space diversity situation, i.e. where the antennas are spaced apart to achieve the desired result, it will be understood that the invented technique applies also to a polarization diversity solution wherein two or more antennas having different polarizations are employed.

We claim:

1. Apparatus for receiving and processing transmitted electromagnetic waves, comprising:
    first and second spaced antennas;
    a common channel;
    switching means for coupling either said first or said second antenna to said common channel;
    signal processing means for processing the signals on said common channel, said signal processing means including means for generating an automatic gain control (AGC) signal which depends upon the instantaneous level of the signal on the common channel;
    means for detecting the rate of change of said AGC signal;
    means for comparing a signal representative of the rate of change of said AGC signal with a threshold, and for generating a control signal when said signal representative of the rate of change of said AGC signal exceeds said threshold; and
    means for applying said control signal to said switching means to effect the switching to the other antenna.

2. Apparatus as defined in claim 1 further comprising means for comparing the signal on said common channel with a predetermined threshold and for generating another control signal in response to said comparison; and means for applying said another control signal to said switching means to further effect switching to the other antenna.

3. Apparatus as defined by claim 1 further comprising:
    further comparing means for comparing the signal on said common channel with another predetermined threshold;

means for generating another control signal when the output of said further comparing means indicates that the signal on said common channel has had a transition to below said another threshold; and
means for applying said another control signal to said switching means to further effect switching to the other antenna.

* * * * *